(12) United States Patent
Louis

(10) Patent No.: US 11,588,356 B2
(45) Date of Patent: Feb. 21, 2023

(54) WIRELESS POWER TRANSFER SYSTEM AND DEVICES

(71) Applicant: Apple Inc., Cupertino, CA (US)

(72) Inventor: Jeffrey Douglas Louis, Auckland (NZ)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/836,384

(22) Filed: Mar. 31, 2020

(65) Prior Publication Data

US 2021/0013749 A1    Jan. 14, 2021

Related U.S. Application Data

(60) Provisional application No. 62/872,389, filed on Jul. 10, 2019.

(51) Int. Cl.
*H02J 50/60* (2016.01)
*H02J 7/02* (2016.01)
*H02J 50/80* (2016.01)
*H02J 50/10* (2016.01)

(52) U.S. Cl.
CPC ............ *H02J 50/60* (2016.02); *H02J 7/02* (2013.01); *H02J 50/10* (2016.02); *H02J 50/80* (2016.02)

(58) Field of Classification Search
CPC .. H02J 50/60; H02J 5/005; H02J 7/025; H02J 50/80; H02J 50/10; H02J 7/02
USPC .......................................................... 307/104
See application file for complete search history.

(56) References Cited

U.S. PATENT DOCUMENTS

| | | | |
|---|---|---|---|
| 2014/0232199 A1* | 8/2014 | Jung | H02J 50/60 307/104 |
| 2020/0099417 A1 | 3/2020 | Park | |
| 2020/0395793 A1* | 12/2020 | Ettes | H02J 50/60 |

\* cited by examiner

*Primary Examiner* — Metasebia T Retebo
(74) *Attorney, Agent, or Firm* — Fletcher Yoder PC

(57) ABSTRACT

A wireless power transmission system comprising a wireless power transmitting device and a wireless power receiving device. The wireless power receiving device is configured to regulate power drawn during a power transfer phase to maintain a substantially steady power level that is less than or equal to a power consumption level demanded by an associated load. The wireless power transmitting device is configured to determine the presence of a foreign object by monitoring the power transmitted or the power received and identifying a characteristic change in steady state power indicative of the presence of a foreign object.

33 Claims, 6 Drawing Sheets

WIRELESS POWER TRANSFER SYSTEM AND DEVICES

FIELD

This relates to a wireless power transfer system and related devices.

BACKGROUND

In inductive, wireless power transfer systems, an inductive power transmitter wirelessly transmits power to an inductive power receiver. The receiver receives the wirelessly transmitted power and provides power to an associated load, such as to an internal battery of an associated device for charging the battery.

Wireless power transfer typically requires communication between the transmitter and the receiver. The wireless power transfer process may also include various phases of operation in which information is shared between the transmitter and receiver for initiating and controlling wireless power transfer. For example, after establishing communication, the receiver may enter a handshake phase to agree on a power transfer contract with the transmitter. The power transfer contract may include one or more terms of power transfer including, for example, a maximum power transfer limit.

The wireless power transfer process may also include a calibration stage, for enabling the transmitter to detect the presence of an unwanted foreign object during wireless power transfer. The calibration stage may involve subjecting the receiver's load to varying calibration power levels, and then using response data from the receiver indicative of wireless power received to formulate a model of expected load behavior during wireless power transfer.

It is a requirement that there are no foreign objects present during the calibration phase to build a reliable load behavior model. For this reason, calibration is typically performed as quickly as possible and the model is only built using up to two varying calibration power levels. This limits the accuracy of the generated model. Furthermore, the calibration power levels are dependent on the state of the load during the calibration phase, which may limit the degree of variance between the calibration power levels and ultimately the reliability of the generated model. For example, a battery with a relatively high state of charge during calibration will only allow for relatively low power levels to calibrate the transmitter. Ultimately, this can limit the reliability of the load behavior model outside these low calibration power levels.

A power transfer phase may be initiated after calibration, in which wireless power is transmitted to the receiver's load as per the load's requirements. The transfer may occur under the terms of the negotiated power transfer contract, for example. In the power transfer phase, the receiver may communicate changing power requirements of the load to the transmitter to dynamically adjust transmitted wireless power accordingly. The receiver may also send information to the transmitter indicating the level of wireless power received during the power transfer phase. The transmitter may use this information to detect the potential presence of an unwanted foreign object by comparing the wireless power received against the model of expected load behavior formulated in the calibration phase.

As previously mentioned, the limitations imposed on the calibration phase can affect the reliability of the generated model and ultimately, the performance of the wireless power transfer system during the power transfer phase. This is particularly the case when the load's requirements during the power transfer phase change beyond the scope of the generated model.

DETAILED DESCRIPTION

A wireless power system has a wireless power transmitting device (which may also be referred to in some instances as a wireless power transmitter or an inductive power transmitter) that transmits power wirelessly to a wireless power receiving device (which may also be referred to in some instances as a wireless power receiver or an inductive power receiver). The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to generate an alternating magnetic field and to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

The term "coil" may include an electrically conductive structure where a time-varying electrical current generates a time-varying magnetic field or vice versa. For example, inductive "coils" may be electrically conductive wire in three dimensional shapes or two dimensional planar shapes, electrically conductive material fabricated using printed circuit board (PCB) techniques into three dimensional shapes over plural PCB "layers", and other coil-like shapes. Other configurations may be used depending on the application. The use of the term "coil", in either singular or plural, is not meant to be restrictive in this sense.

Figure 1:
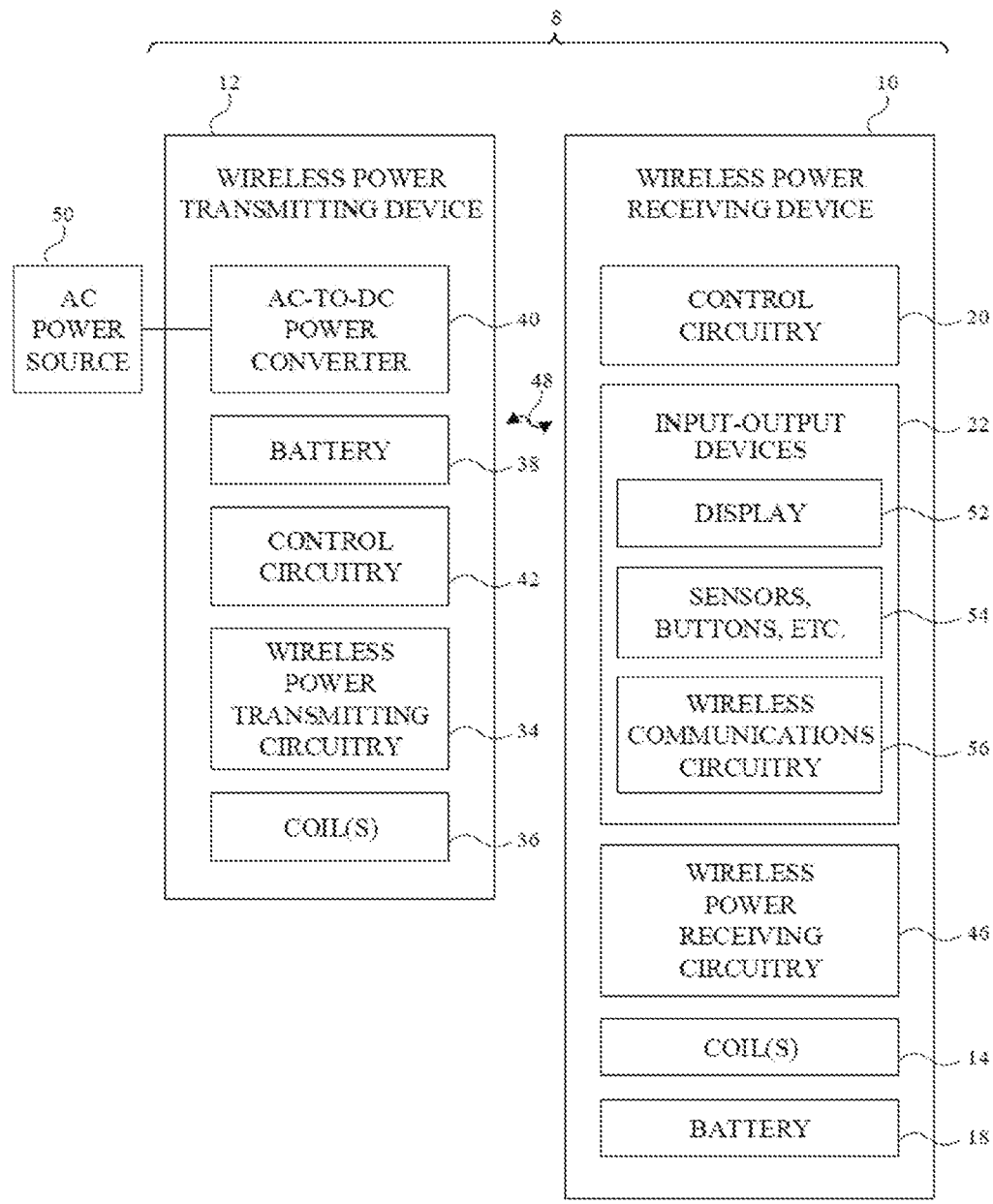
FIG. 1 is a schematic diagram of an illustrative wireless power system in accordance with some embodiments.

An illustrative wireless power system is shown in FIG. 1. As shown in FIG. 1, a wireless power system 8 includes a wireless power transmitting device 12 (which may also be referred to in some instances as an inductive power transmitter) and one or more wireless power receiving devices such as wireless power receiving device 10 (which may also be referred to in some instances as an inductive power receiver). Device 12 may be a stand-alone device such as a wireless charging mat, may be built into a laptop or tablet computers, cellular telephones or other electronic device, furniture, or may be other wireless charging equipment. Device 10 is a portable electronic device such as a wristwatch, a cellular telephone, a laptop or tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. For example, in one exemplary embodiment electronic device 12 is a tablet computer and electronic device 10 is a stylus configured to attach to electronic device 12 (tablet) and be wirelessly (e.g., inductively) charged by electronic device 12 (tablet). Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a power storage device such as battery 38 for supplying power, and/or is coupled to another source of power. A power converter such as AC-DC power converter 40 can be included to convert power from a mains power source or other alternating current (AC) power source into direct current (DC) power that is used to power control circuitry 42 and other circuitry in device 12. During operation, control circuitry 42 uses wireless power transmitting circuitry 34 and one or more coils 36 coupled to circuitry 34 to generate an alternating magnetic field and to transmit alternating-current wireless power signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time-varying magnetic field (wireless power signals 48) or "flux" is generated, that is received by one or more corresponding coils 14 electrically connected to wireless power receiving circuitry 46 in receiving device 10. If the time-varying magnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and/or are used in charging an internal power storage device in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in sensing for foreign or other non-receiver objects (e.g.: metallic objects such as coins or radio frequency identification (RFID) tags within electronic devices), determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Such media may sometimes be referred to herein as electronic memory. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example, device 12 and/or device 10 may communicate using in-band communications injected or combined into the wireless power signals 48 such as proposed in the Wireless Power Consortium Qi specification 1.2.3, which is incorporated herein by reference. Alternatively, a separate Bluetooth, RFID, near-field communication (NFC), Zigbee, WiFi, radio-frequency (RF) or other communication system may be employed. A wireless transmission signal may include a "message" from one device to the other. A wireless communication message can comprise data that can be read by control circuitry 42 or 20 of devices 10 or 12. Sending and receiving a "message" is to be interpreted as sending and receiving a wireless communication signal comprising the message.

Devices 10 and 12 may communicate in accordance with a wireless power transfer standard. For example, the Qi wireless charging standard defines a "baseline power profile" (BPP) communication protocol for power transfer to loads up to 5 W. The Qi standard also defines an "extended power profile" (EPP) communication protocol to facilitate wireless power transfer to loads up to 15 W. In some embodiments, control circuitry 20 and control circuitry 42 of devices 10 and 12 may be configured to operate in accordance with the BPP and EPP protocols.

Wireless Power Transfer Process

Figure 2:
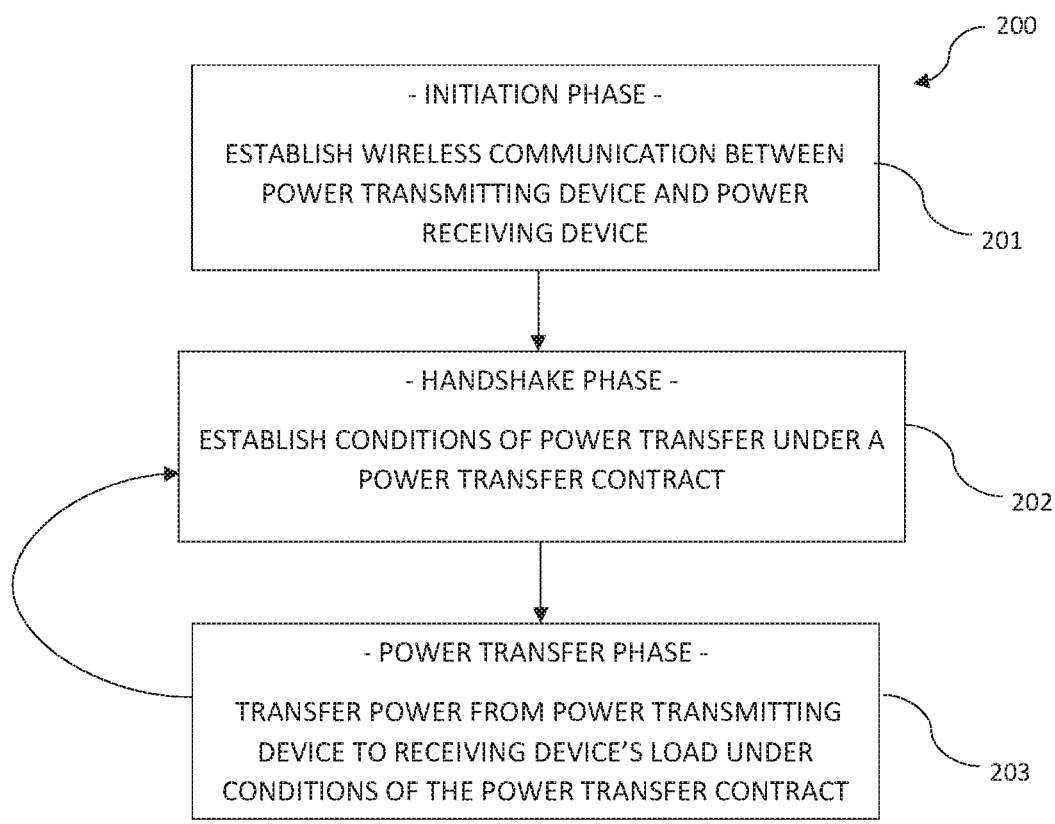
FIG. 2 is a flow chart of a wireless power transfer process which may be used by the wireless power transfer system of FIG. 1 in some embodiments.

Referring to FIG. 2, in some embodiments, transmitting and receiving devices 12 and 10 are configured to operate in accordance with a wireless power transfer process 200 for initiating and controlling wireless power transfer. The power transfer process 200 comprises an initiation phase 201, a handshake phase 202 and a wireless power transfer phase 203. The process may also comprise an optional calibration phase (not shown in FIG. 2), but briefly described below. The phases of the process 200 may be sequential in that a previous phase must be terminated before a current phase is initiated, or in some embodiments, one or more phases may be combined or be allowed to operate simultaneously. For example, the initiation phase may overlap with the handshake phase, or the optional calibration phase may operate simultaneously with the power transfer phase in some configurations. One or both of transmitting or receiving devices 12 or 10 may be configured to act as "initiator" of a phase and/or as "terminator" of a phase.

During initiation phase 201, transmitting device 12 establishes wireless communication with a receiving device 10 when receiving device 10 is within communication range of transmitting device 12. Transmitting device 12 can confirm the presence of receiving device 10 by sending interrogation signal(s) and listening for a response signal from receiving device 10, for example. Control circuitry 42 of transmitting device 12 can be configured to continuously or periodically generate and send (via wireless power transmitting circuitry 34 or other wireless communications circuitry), interrogation signal(s) during the initiation phase 201. Control circuitry 20 of receiving device 10 can be configured to listen for interrogation signal(s) from nearby transmitting device(s) 12 and to generate and send, in response, one or more response message(s) (via wireless communications circuitry 56, for example). The response message(s) may include data indicative of a received signal strength. The response message(s) may include identification data associated with receiving device 10. The response message(s) may also include configuration data indicative of a desired or required configuration settings for transmitting device 12. Control circuitry 42 of transmitting device 12 can be configured to receive the response message(s) from receiving device 10 and determine from the response messages(s) an appropriate connection for wireless power transfer. For example, control circuitry 42 may be configured to confirm the suitability of a connection using one or more variables associated with the response message(s), such as signal strength, receiver identification and/or configuration settings. Control circuitry 42 may also update or adjust one or more configuration parameters associated with wireless power transfer using configuration data from the response message(s).

During or prior to initiation phase 201, transmitting device 12 may be configured to determine the presence of a foreign object such as bankcards, coins or other metals, in the field of magnetic flux. In some embodiments, control circuitry 42 can be configured to detect the presence of a foreign object using one or more operational parameters of transmitting coil(s) 36. For example, control circuitry 42 may detect the presence of a foreign object using the inductance of coil(s) 36, the resistance of coil(s) 36, the quality factor of coil(s) 36, or any combination thereof. Control circuitry 42 may compare a value or value(s) of one or more operational parameters against associated a predetermined threshold criterion or criteria to detect the presence of a foreign object. Control circuitry 42 of transmitting device 12 may only enable progression of process 200 into the handshake phase 202, or any other succeeding stages, after confirming the absence of any foreign object(s) in the field of magnetic flux.

Upon establishing a connection, connected transmitting and receiving devices 12 and 10 can proceed into a handshake phase 202. During handshake phase 202, transmitting and receiving devices 12 and 10 communicate to establish a power transfer contract, governing one or more conditions of power transfer for the power transfer phase 203. The power transfer condition(s) of the power transfer contract may comprise a power transfer limit, a minimum power transfer level, a messaging format, frequency-shift key (FSK) polarity, FSK modulation depth or any combination thereof, for example. The power transfer condition(s) can be stored in memory associated with control circuitry 42 of transmitting device 12 and used to control wireless power transmitting circuitry 34 during the power transfer phase 203 accordingly. In some embodiments, one or more of the power transfer condition(s) may be pre-established and pre-stored in memory associated with control circuitry 42 of the transmitting device 12. In some embodiments, one or more of the power transfer condition(s) may be communicated by the receiving device 10 to the transmitting device 12 during handshake phase 202. In some embodiments, one or more of the power transfer condition(s) may be determined by the transmitting device 12 or receiving device 10 using one or more operational variables of receiving device 10. For example, a maximum power transfer limit condition may be determined by receiving device 10 using a state of charge of a battery 18 associated with receiving device 10. The determined maximum power transfer limit condition can be communicated by receiving device 10 to transmitting device 12 during the handshake phase 202. Control circuitry 42 of transmitting device 12 is configured to drive wireless power transmitting circuitry 34 to transmit wireless power in accordance with the power transfer contract established in phase 202.

During power transfer phase 203, transmitting device 12 transfers wireless power to the receiving device 10 for supply to a load of the receiving device 10, which may include battery 18, for example. Received wireless power may be transferred to battery 18 only which is used to power other devices or circuitry in the device 10, such as wireless power receiving circuitry 46, input-output devices 22 and control circuitry 20. Alternatively, one or more of other devices or circuitry in the device 10 may be powered directly through wireless power received from transmitting device 12. In phase 203, control circuitry 42 can be configured to generate a drive signal for wireless power transmitting circuitry 34 to transfer wireless power from transmitting device 12 to receiving device 10 in accordance with the condition(s) of the power transfer contract established during handshake phase 202. Wireless power transfer is substantially continuous in phase 203.

Figure 3:
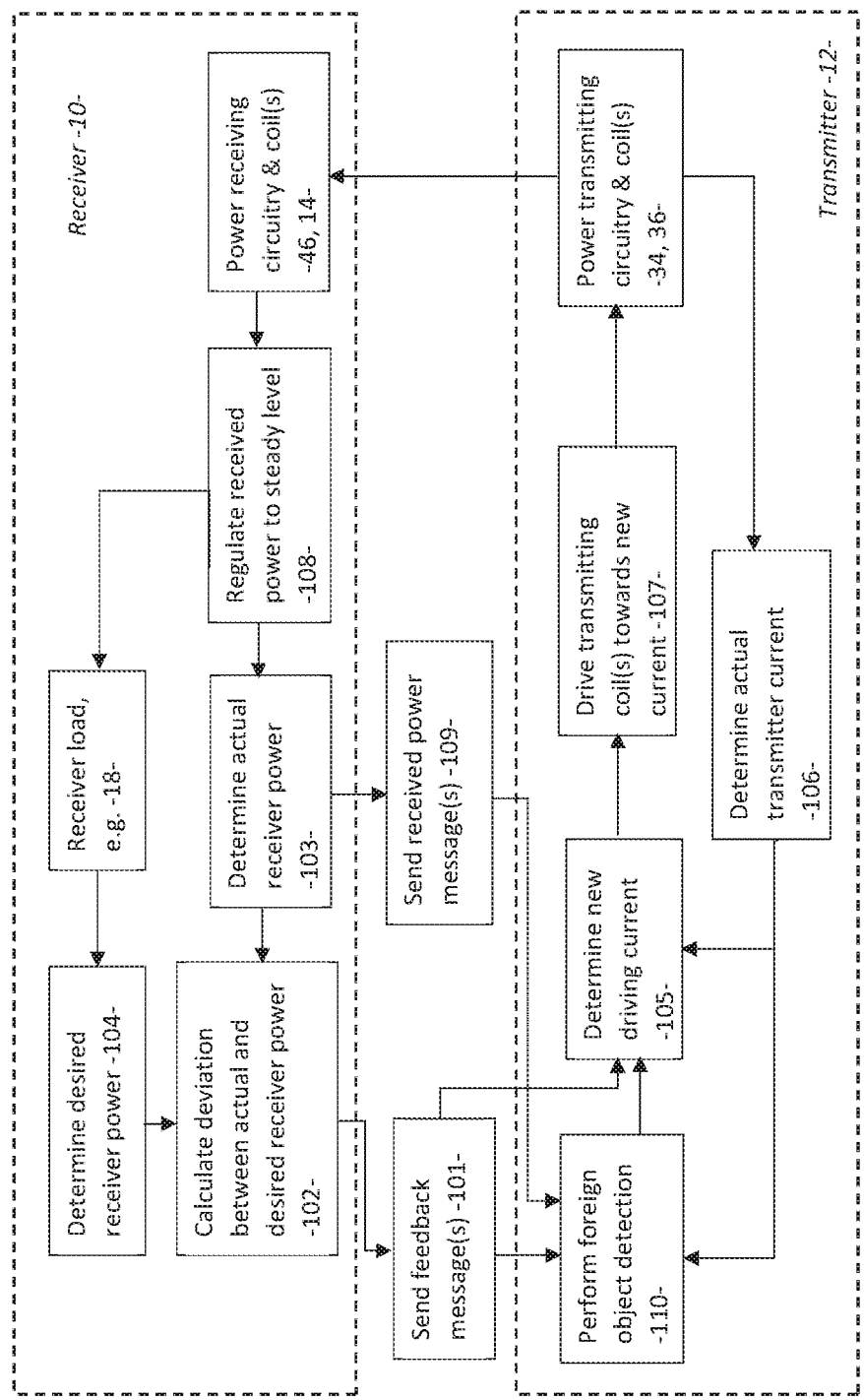
FIG. 3 is a flow chart showing an exemplary control loop of the wireless power system of FIG. 1 during a power transfer phase in some embodiments.

FIG. 3 shows a schematic of a control loop that can be used by the system 8 during power transfer phase 203. Wireless power is transferred from transmitting device 12 to receiving device 10 according to the power requirements of the receiver's load, which may include the charging requirements of battery 18, for example. Receiving device 10 can be configured to generate feedback message(s) 101 indicative of a level of deviation 102 between actual received power 103 and a desired power requirement 104 of the load. The feedback message(s) 101 may be communicated to transmitting device 12 for adjusting a level of transferred wireless power accordingly, if necessary. Control circuitry 42 of transmitting device 12 can be configured to receive feedback message(s) 101 and to determine and generate a new driving signal 105, 107 for wireless power transmitting circuitry 34 using the feedback message(s) 101 to reduce the level of deviation towards zero. The new driving signal 105 may be determined using a current driving signal as feedback from the transmitting circuitry 34. The feedback message(s) 101 may be generated periodically by control circuitry 20 during power transfer phase 203. Power is received by the coil(s) 14 and regulated to a steady level—108—by wireless power receiving circuitry 46, which is then supplied to the load, as will be explained in further detail below.

Control circuitry 20 of receiving device 10 is also configured to generate received power message(s) 109 using the receiving circuitry 46, and to send the received power message(s) to transmitting device 12 using wireless communication circuitry 56. The received power message(s) can indicate of a level of power received by coil(s) 14. The received power message(s) may be sent periodically during power transfer phase 203.

Control circuitry 42 of transmitting device 12 can be configured to determine the potential presence of a foreign object 110. This may be achieved using any combination of the feedback message(s) 101, received power message(s) 109 and/or monitored transmitter current 106. For example, control circuitry 42 may monitor the feedback message(s), received power message(s) and/or transmitter current for uncharacteristic behavior to determine the potential presence of an unwanted foreign object. This is explained in further detail below. Upon detection of a foreign object, control circuitry 42 may reduce transmitted power to a safe level or terminate wireless power transfer by driving wireless power transmitting circuitry 34 accordingly.

In some embodiments, transmitting and receiving devices 12 and 10 may be configured to terminate a power transfer phase 203 and to return to a handshake phase 202 to establish a new power transfer contract, if prompted by one of the devices 12 or 10. In some embodiments, either one of transmitting or receiving device 12 or 10 may be configured to terminate power transfer phase 203 and reinitiate handshake phase 202. In other embodiments, only one of transmitting or receiving device 12 or 10 may be configured to terminate power transfer phase 203 and reinitiate handshake phase 202. For example, receiving device 10 may be configured to terminate a power transfer phase 203 and re-initiate a handshake phase 202 when a desired power requirement of an associated load, such as battery 18, is outside a threshold value or range of a current power transfer contract.

In some embodiments, transmitting and receiving devices 10 and 12 may be configured to perform a pre-power-transfer calibration (not shown in FIG. 2). In pre-power-transfer calibration, transmitting device 12 can be configured to request the receiving device to provide multiple varying calibration power levels, and to receive received power message(s) in response indicative of a level of wireless power received by receiving device 10. Two or more varying calibration power levels may be transmitted to receiving device 10 in this phase. Control circuitry 42 can determine the calibration power levels using one or more operational variables associated with the receiver's load. For example, each calibration power level may be determined based on a different percentage of a maximum power consumable by the load, e.g., 10% and 100%. Other calibration load levels within this range may be transmitted in this phase. Control circuitry 42 can use the received power message(s) and associated the calibration power levels to generate a model of expected load behavior. For example, the model may be generated using a linear regression technique. The model can be stored in electronic memory associated with control circuitry 42. During power transfer phase 203, control circuitry 42 can use received power message(s) sent by receiving device 10 and the pre-stored model to determine the potential presence of a foreign object. Control circuitry 42 may compare a level of received power against an expected level of received power obtained from the model for a current transmission power level, and determine from the level of deviation a value or values indicative of the presence of a foreign object. Control circuitry 42 may adjust operation of wireless power transmitting circuitry 34 and/or send warning message(s) to receiving device 10 upon detection of a foreign object as previously described.

Maintaining Steady State Power Levels in Power Transfer Phase

Figure 4:
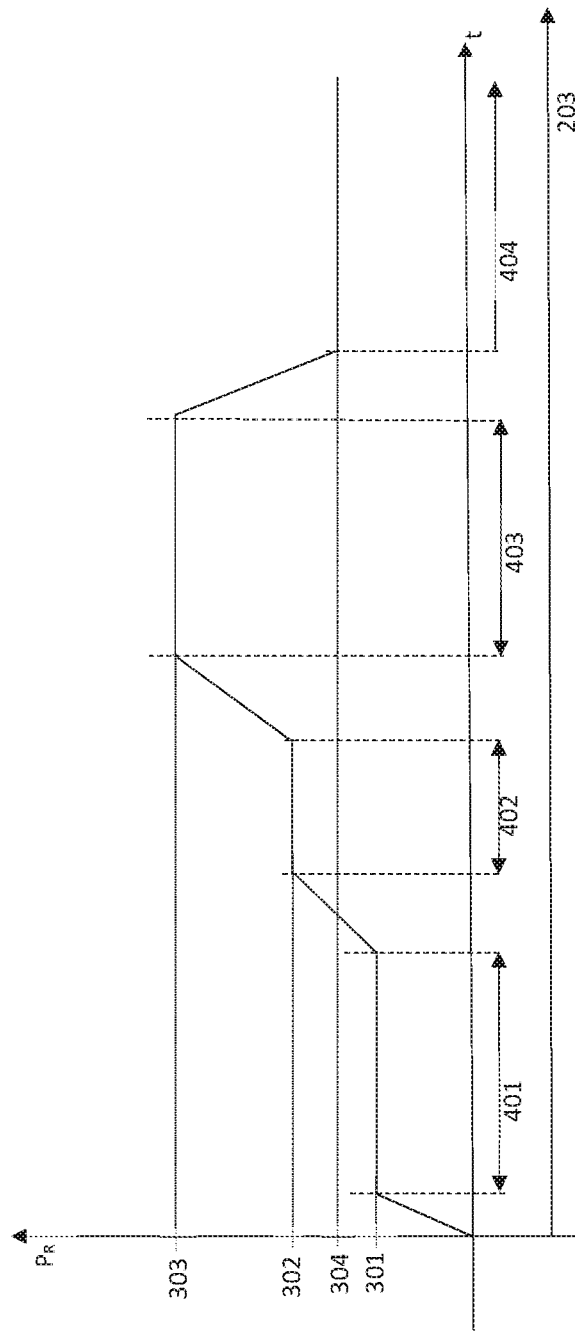
FIG. 4 is a graph showing exemplary power levels regulated by a wireless power receiver during a power transfer phase in some embodiments.
Figure 5:
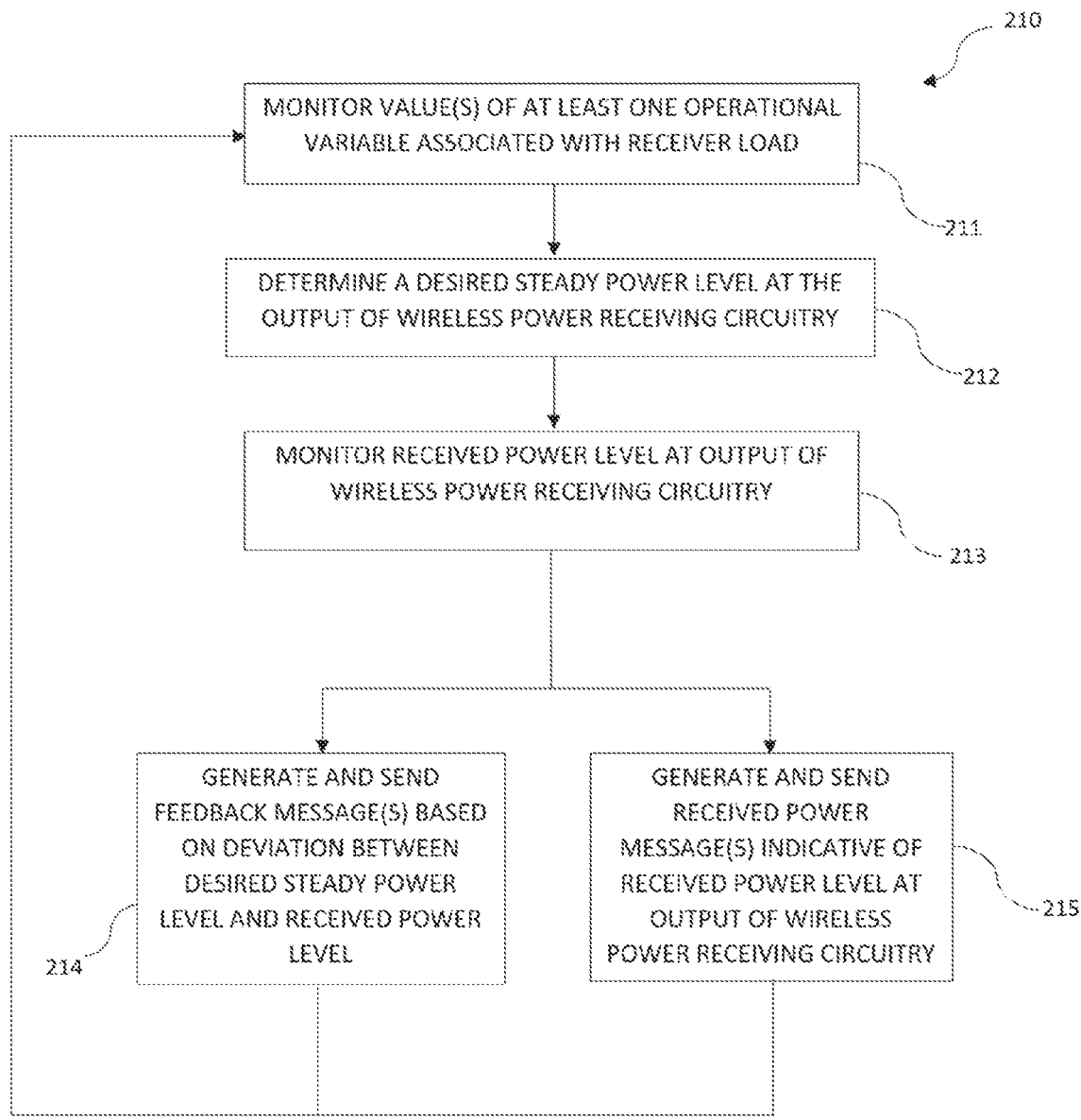
FIG. 5 is a flow chart showing the operation of a wireless power receiver during a power transfer phase in some embodiments.

Referring to FIGS. 3-5, in some embodiments receiving device 10 can be configured to regulate a level of power drawn PR by coil(s) 14 for supply to an associated load during power transfer phase 203, to maintain substantially steady power level(s) 301-304 that is less than or substantially equal to the power requirements of the load, such as the charging requirements of battery 18. In this specification, a substantially steady power level is intended to mean a power level that remains within an acceptable level of deviation from a reference level, depending on the application. For example, in the context of portable electronic devices, a power signal having a substantially steady power level may mean a power signal with an amplitude that does not fluctuate more than approximately 1% of its average or steady value at a frequency or frequencies above approximately 20 Hertz. In another example, the power level may be considered to be substantially steady if a level of variance in the power level does not exceed approximately a threshold, which may be a value or a percentage such as 1% or 10%, for a time period, such as three seconds. The threshold may be a predetermined threshold. The time period may be a predetermined time period. The level of variance may be a standard statistical variance measure or an application-specific variance measure, such as an Allan Variance. Control circuitry 20 and/or wireless power receiving circuitry 46 can be configured to regulate the level of power drawn, PR, by coil(s) 14 to maintain steadiness within such limits. In this manner, at each one of multiple distinct periods 401-404 during the power transfer phase 203, control circuitry 20 may regulate power drawn by power receiving coil(s) 14 to substantially one of a plurality of distinct steady power levels 301-304.

Circuitry 46 may comprise rectifier circuitry that may be controlled by control circuitry 20, for example, to maintain a substantially steady output power level. Phase control of the rectifier may limit the input current when driven by a voltage source, such as a wireless power receiver coil and a tuning capacitor. One or more error amplifiers may be incorporated which take, as input, a signal from a current sensing resistor at the input of the rectifier. Optionally, one or more error amplifiers may take in the output voltage of the rectifier as an input.

The steady power level is selected or determined based on at least one operational variable associated with the load. The operational variable may be one that is expected to remain substantially constant or stable over a significant period of time during power transfer phase 203, or that does not normally exhibit rapid unexpected changes during power transfer 203. In other words, the steady power level may be based upon a predictable parameter or parameters. For example, the steady power level may be determined or selected using any combination of one or more following operational variables: state of charge of battery 18, rate of charge of battery 18, temperature of battery 18, internal ambient temperature of receiving device 10, and/or work load of one or more processors performing a predictable function (such as a software update). In some embodiments, control circuitry 20 may select or determine a desired steady power level for a corresponding distinct period using one or more of the abovementioned operational variables and a predetermined look-up table stored in electronic memory associated with circuitry 20. In some embodiments, control circuitry 20 may determine a desired steady power level using one or more of the abovementioned operational variables and a predetermined algorithm stored in electronic memory associated with circuitry 20.

To regulate power drawn from transmitting device to a steady power level during power transfer period 203, control circuitry 20 can be configured to operate in accordance with method 210 of FIG. 5. At step 211, control circuitry 20 can monitor at least one operational variable associated with the load. Control circuitry 20 can then use the value(s) of at least one operational variable to select or determine a desired, steady power level (step 212). At step 213, control circuitry 20 can also monitor received power at an output of wireless power receiving circuitry 46. A feedback message can be generated and sent to transmitting device 12 by calculating the deviation between the desired steady power level and the received power level (step 214). Control circuitry 20 may also send received power message(s) including the received power level (step 215).

One or more of the distinct steady power levels 301-304 may be predetermined and stored in electronic memory associated with control circuitry 20. For example, at least two, or at least three or more distinct steady power levels may be pre-stored in memory. The distinct steady power levels may be evenly distributed between a minimum distinct power level and a maximum distinct power level. For instance, a lowest distinct power level may be 1 W and a highest distinct power level may be 15 W and the predetermined distinct steady power levels may be 1 W increments between 1 W and 15 W. Any other minimum and maximum power level may be utilized as per the requirements of the application. Similarly, any other increment level may be utilized. In yet another example, the distinct steady power levels may not be evenly distributed between a minimum and maximum level and may be otherwise predetermined using an alternative technique. In some embodiments, one or more distinct power levels are not predetermined and at step 212 control circuitry 20 is configured to determine a desired, steady power level using a predetermined technique.

At step 212, control circuitry 20 can be configured to select or determine a desired steady power level for a respective distinct period of power transfer phase 203 using one or more operational variable(s) associated with the load. Control circuitry 20 may use a look-up table to select the desired steady power level using the operational variable(s). For example, a look-up table may translate a state of charge of battery 18 (e.g. 10-50% or 70-100%) to a desired steady state power level (e.g. 8.4 W or 0.84 W, respectively). Alternatively, control circuitry 20 may use an algorithm, or at least one predetermined criterion stored in memory, for determining the desired steady power level using the operational variable(s). For example, control circuitry 20 may be configured to round down a power level required by the load to a nearest whole value. In another example, control circuitry 20 may increase or decrease the distinct power level by a predetermined amount (e.g., 20%) when one or more operational variables change by a predetermined amount (e.g., battery charge level changes by 10%).

In some embodiments, control circuitry 20 may be configured to periodically select or determine a desired steady power level. Additionally, or alternatively, control circuitry 20 may be triggered to select or determine a new, desired steady power level when a current value of at least one operational variable deviates from a previous value by a predetermined amount. In some embodiments, control circuitry 20 may be triggered to determine a new, desired steady power level when a received power level deviates from the current, desired steady state power level by more than a threshold amount, e.g. >1 W.

At step 214, control circuitry 20 of receiving device 10 can be configured to generate feedback message(s) during power transfer phase 203 indicative of a level of deviation between received power at power receiving coil(s) 14 and a desired, steady power level for a current period of power transfer. The feedback message(s) may indicate a requested change in wireless power transmitted, such as an increase or decrease in wireless power transmitted. Control circuitry 42 of the transmitting device 12 may be configured to receive the feedback message(s) and, if necessary, generate or adjust the driving signal for the wireless power transmitting circuitry 34 accordingly. Control circuitry 42 may be configured to adjust the driving signal to reduce the level of deviation toward zero. The feedback message(s) may be generated periodically by control circuitry 20 during power transfer phase 203.

At step 215, control circuitry 20 of receiving device 10 can also be configured to generate received power message(s) indicative of a level of received power at the power receiving coil(s) 14, and to send the received power message(s) to transmitting device 12 during power transfer phase 203. The received power message(s) may be generated and sent periodically during power transfer phase 203. Control circuitry 42 of transmitting device 12 can be configured to receive the received power message(s) and to determine a level of deviation between the desired, steady power level for a distinct period during power transfer phase 203 and the received power level of associated with the distinct period. Control circuitry 42 can use the level of deviation to generate or adjust a driving signal for the wireless power transmitting circuitry 34 to reduce the level of deviation, if necessary, toward zero. In some embodiments, control circuitry 42 of transmitting device 12 may be configured to receive the received power signals and to determine the potential presence of a foreign object using the level of received power as described in further detail below.

Foreign Object Detection Techniques

Control circuitry 42 of transmitting device 12 is configured to monitor transmitted or received power, or both, during power transfer phase 203 to determine conditions that may indicate the introduction of a foreign object within the wireless power transfer system's field of flux. Such conditions may include a deviation of transmitted or received power from an expected steady state condition, or a deviation of transmitted or received power from an expected level by more than a threshold amount, for example.

Figure 6:
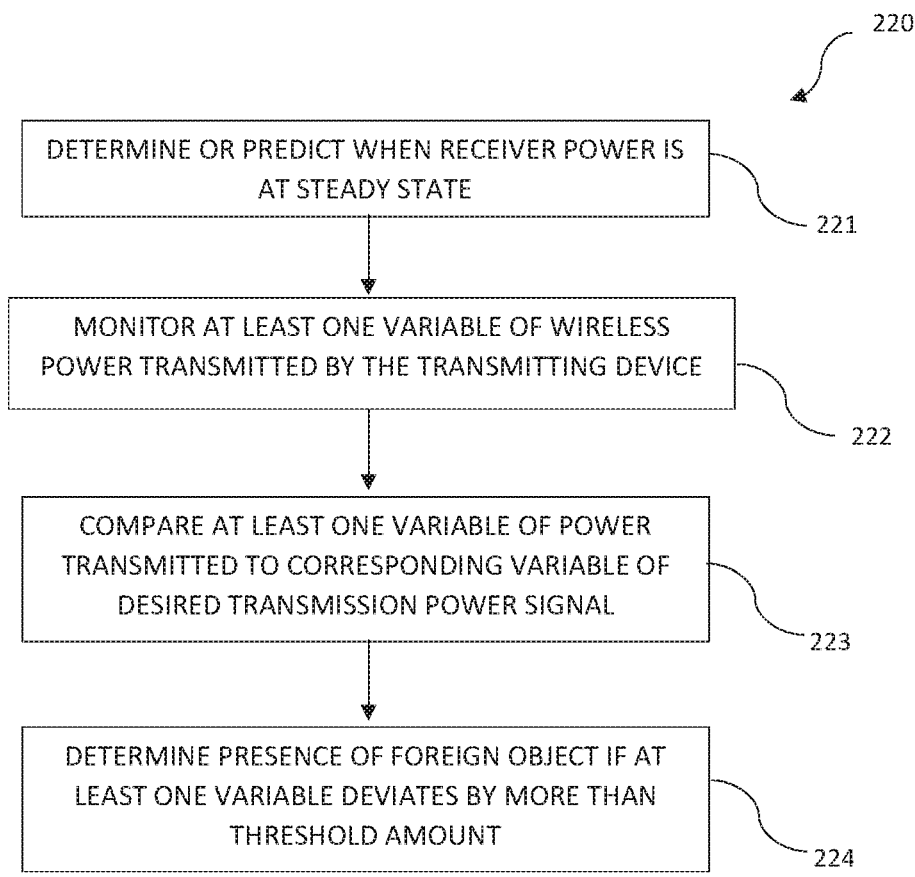
FIG. 6 is a flow chart showing the operation of a wireless power transmitter during a power transfer phase in some embodiments.

Referring to FIG. 6, in some embodiments control circuitry 42 of transmitting device 12 can be configured to operate in accordance with method 220 for determining the presence of a foreign object during power transfer phase 203. At step 221, control circuitry 42 is configured to predict or determine when power received by receiving device 10 is substantially at steady state and accordingly, an opportunity for foreign object detection exists. Control circuitry 42 may be configured to determine when power received is at a steady state using one or more messages received from receiving device 10. For example, control circuitry 42 may use the feedback messages or received power messages from receiving device 10 to determine if power received is at a steady state. Alternatively, or in addition, control circuitry 42 may predict or determine if received power is at a steady state when at least one pre-established condition is met. For example, control circuitry 42 may predict that received power is at a steady state when a predetermined threshold period elapses after the system enters power transfer phase 203. In another example, control circuitry 42 may predict that received power is at a steady state by monitoring transmitted power and identifying when at least one pre-established condition of transmitted power is met. After determining that an opportunity for foreign object detection exists, control circuitry 42 can monitor at least one variable of wireless power transmitted by transmitting device 12 (step 222) and compare the at least one variable to a reference value. The reference value may be predetermined and stored in memory or it may be determined from a reference steady state power signal (step 223). The reference steady state power signal may be a desired, received steady state power signal, for example. Control circuitry 42 may identify the presence of a foreign object when the at least one variable deviates from the reference value by more than a threshold amount (step 224).

The at least one variable of wireless power transmitted may be a variable of an output current or voltage of wireless power transmitting circuitry 34, for example. The variable may be determined using a sensor, such as a current sensor, connected to wireless power transmitting circuitry 34. The at least one variable of wireless power transmitted may be determined using one or more messages from receiving device 10. For example, the at least one variable may include a variable of received wireless power. The at least one variable may include a variable of the wireless power rectified by wireless power receiving circuitry 46.

The at least one variable may include any combination of one or more of: an amplitude, an average level, a frequency and/or a variance of the monitored signal, for example. Control circuitry 42 may be configured to compare one or more of these variables with a reference value of a corresponding variable. For example, control circuitry 42 may compare an amplitude or average level of current at the output of circuitry 34 to a reference amplitude or average level indicative of a desired, transmitted power and/or desired, received power. Control circuitry 42 may determine if the variable, such as amplitude or average level, varies from the reference value by more than a threshold amount to indicate the potential introduction of a foreign object into the system. For example, the introduction of a foreign object may cause transmitter current to unexpectedly increase by more than a threshold amount to compensate for power losses resulting from the new foreign object in the system. In some embodiments, a deviation of the monitored variable from the reference value may indicate a deviation of transmitted and received power from an expected, steady state. This may, in turn, indicate the potential introduction of a foreign object as the object may cause a deviation from steady state in transmitted and/or received power. For example, a frequency of the amplitude of the monitored signal that is outside a threshold frequency band (e.g. larger than 20 Hertz), or a variance in the amplitude of the monitored signal that is outside a threshold variance range (e.g. larger than 10%), may indicate a deviation of transmitted and/or received power from the steady state that is indicative of the potential introduction of an unwanted foreign object in the system.

Building a Foreign Object Detection Model

Figure 7:
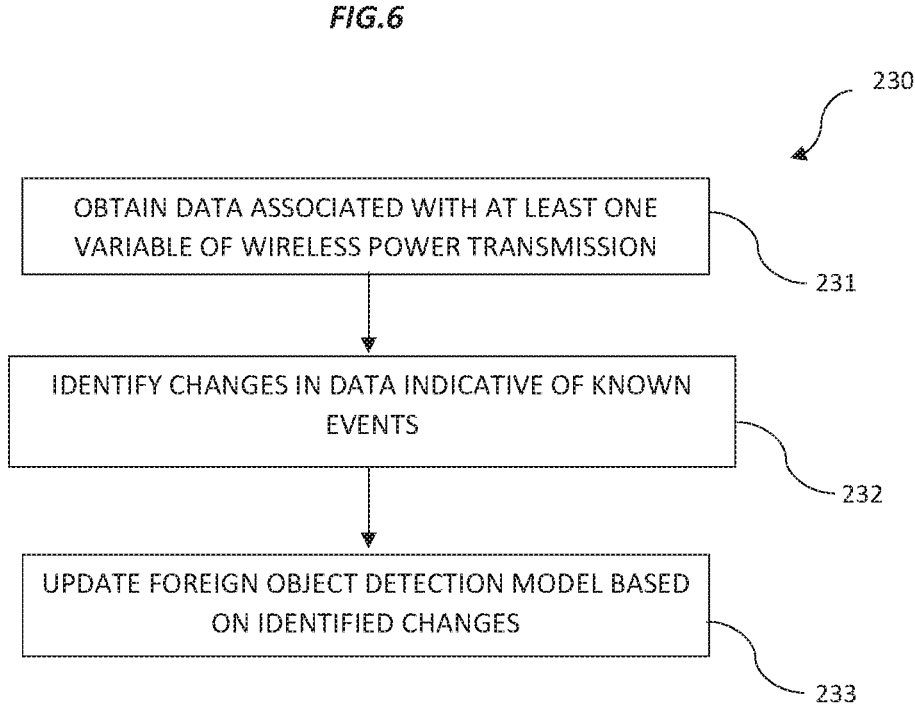
FIG. 7 is a flow chart showing the operation of a wireless power transmitter during a power transfer phase to generate and update a foreign object detection model in some embodiments.

Referring to FIG. 7, in some embodiments, control circuitry 42 is configured to build or update a foreign object detection model stored in associated electronic memory during power transfer 203, in accordance with method 230. A foreign object detection model may be generated during a pre-power-transfer calibration phase and control circuitry 42 may be configured to update the model during power transfer phase 203 in accordance with method 230. Alternatively, a foreign object detection model may be generated and updated during power transfer phase 203 in accordance with method 230.

The model may be based on at least one variable associated with wireless power transmitted including, for example: power, current or impedance at the output of wireless power transmitting circuitry 34, power, current or impedance at the output of the wireless power receiving circuitry 46 or deviation between wireless power received and a desired wireless power level. The model may be built by receiving learning data indicative of at least one variable associated with wireless power transmitted (step 231), observing characteristic changes in the learning data (step 232), and attributing the change(s) to associated events to generate or update the model (step 233). Such events may include, for example, changes in temperature in transmitting device 12 and/or receiving device 10, changes in relative orientations between devices 12 and 10, changes in usage of the receiver's load and/or the introduction of foreign object(s). For example, the introduction of an unwanted foreign object may cause a characteristic profile change in current at wireless power transmitting circuitry 34. The model may store this characteristic change in current profile and associate it with the potential presence of an unwanted foreign object. Control circuitry 42 may use a Kalman filter or a Particle filter with additional input variables such as coil current, coil voltage, temperature, inertial measurement sensors or user touch sensing to generate and update the model based on the learning data to improve discrimination between changes in transmitted power (or current in the coils 36) due to the presence of a foreign object with changes due to residual fluctuations or drift in the steady power level being maintained by receiver device 10 such as due to internal temperature change, physical movement or change in orientation of the receiver device 10.

Accordingly, control circuitry 42 can be configured to receive data indicative of the at least one variable associated with the foreign object detection model during power transfer phase 203, and use the model to identify the likelihood of an associated event, such as the introduction of a foreign object. Control circuitry 42 may take appropriate action depending on the identified event, such as the reduction of transmission current or termination of power transfer when a foreign object is introduced.

The foregoing is merely illustrative and various modifications can be made to the described embodiments. The foregoing embodiments may be implemented individually or in any combination, and elements from one embodiment may be combined with others.

The invention claimed is:

1. A wireless power transmitter comprising:
   a power transmitting coil configured to transmit wireless power to a wireless power receiver; and
   control circuitry coupled to the power transmitting coil, the control circuitry configured to:
   drive the power transmitting coil to transmit wireless power during a power transfer period;
   determine when the wireless power transmitted during the power transfer period is at a substantially steady power level regulated by the wireless power receiver;
   when wireless power transmitted during the power transfer period is at the substantially steady power level regulated by the wireless power receiver, monitor at least one variable associated with wireless power transmitted by the wireless power transmitting coil during the power transfer period, wherein the at least one variable includes a signal amplitude associated with the wireless power transmitted; and
   identify a presence of a foreign object affecting power transfer between the power transmitting coil and the wireless power receiver when a characteristic change of the at least one variable associated with wireless power transmitted by the wireless power transmitting coil during the power transfer period is observed.

2. The wireless power transmitter of claim 1 wherein the at least one variable associated with wireless power transmitted by the wireless power transmitting coil during the power transfer period includes at least one variable of wireless power rectified by the wireless power receiver using wireless power received from the power transmitting coil.

3. The wireless power transmitter of claim 1 wherein the at least one variable associated with wireless power transmitted by the wireless power transmitting coil during the power transfer period includes at least one variable of wireless power received by the wireless power receiver.

4. The wireless power transmitter of claim 3 wherein the control circuitry is configured to monitor the at least one variable using at least one message received from the wireless power receiver indicative of the wireless power received by the wireless power receiver.

5. The wireless power transmitter of claim 3 wherein the control circuitry is configured to monitor the at least one variable of received wireless power using at least one message sent by the wireless power receiver, the at least one message including data indicative of a requested change in the wireless power transmitted by the wireless power transmitter.

6. The wireless power transmitter of claim 1 wherein the at least one variable associated with wireless power transmitted by the wireless power transmitting coil during the power transfer period includes at least one variable of the wireless power transmitted by the wireless power transmitter.

7. The wireless power transmitter of claim 1 wherein the at least one variable includes a frequency component of a power spectral density of a signal amplitude associated with the wireless power transmitted.

8. The wireless power transmitter of claim 7 wherein the control circuitry is configured to identify the presence of a foreign object by detecting when a magnitude of frequency components of the power spectral density of the signal amplitude exceed a corresponding threshold amplitude for each frequency component.

9. The wireless power transmitter of claim 1 wherein the at least one variable includes a signal variance associated with the wireless power transmitted.

10. The wireless power transmitter of claim 9 wherein the control circuitry is configured to identify the presence of a foreign object by detecting when the signal variance is outside a threshold variance range.

11. The wireless power transmitter of claim 1 wherein the at least one variable includes a signal average associated with the wireless power transmitted.

12. The wireless power transmitter of claim 1 wherein the control circuitry is further configured to identify the presence of a foreign object affecting power transfer between the power transmitting coil and the wireless power receiver when the at least one monitored variable changes by more than a threshold amount relative to a corresponding variable of a reference steady state power signal.

13. The wireless power transmitter of claim 1 wherein the control circuitry is further configured to:
   determine a reference steady state power signal from wireless power transmitted when wireless power transmitted during the power transfer period is at the steady power level regulated by the wireless power receiver; and
   identify the presence of a foreign object affecting power transfer between the power transmitting coil and the wireless power receiver when a characteristic change of the at least one monitored variable of the wireless power transmitted is observed relative to a corresponding variable of the reference steady state power signal.

14. The wireless power transmitter of claim 1 wherein the control circuitry is configured to determine when wireless power transmitted is at the substantially steady power level regulated by the wireless power receiver when a frequency of an amplitude of fluctuations in the wireless power transmitted is less than approximately 20 Hertz.

15. The wireless power transmitter of claim 1 wherein the control circuitry is configured to determine when wireless power transmitted is at the substantially steady power level regulated by the wireless power receiver when a signal variance associated with wireless power transmitted is less than approximately 1 percent.

16. The wireless power transmitter of claim 1 wherein the control circuitry is configured to determine when wireless power transmitted is at the substantially steady power level regulated by the wireless power receiver when a threshold time period elapses after entering a power transfer phase.

17. The wireless power transmitter of claim 1 wherein the control circuitry is configured to determine when wireless power transmitted is at the substantially steady power level regulated by the wireless power receiver using at least one message from the wireless power receiver indicating a steady power level of wireless power received.

18. The wireless power transmitter of claim 1 wherein the control circuitry is further configured to reduce wireless power transmitted via the power transmitting coil after identifying the presence of a foreign object.

19. The wireless power transmitter of claim 1 wherein the control circuitry is further configured to terminate wireless power transmission via the power transmitting coil after identifying the presence of a foreign object.

20. A wireless power transmitter comprising:
a power transmitting coil configured to transmit wireless power to a wireless power receiver; and
control circuitry coupled to the power transmitting coil, the control circuitry configured to:
drive the power transmitting coil to transmit wireless power during a power transfer period;
determine when the wireless power transmitted during the power transfer period is at a substantially steady power level regulated by the wireless power receiver;
when wireless power transmitted during the power transfer period is at the substantially steady power level regulated by the wireless power receiver, monitor at least one variable associated with wireless power transmitted by the wireless power transmitting coil during the power transfer period, wherein the at least one variable includes a frequency component of a power spectral density of a signal amplitude associated with the wireless power transmitted; and
identify a presence of a foreign object affecting power transfer between the power transmitting coil and the wireless power receiver when a characteristic change of the at least one variable associated with wireless power transmitted by the wireless power transmitting coil during the power transfer period is observed.

21. The wireless power transmitter of claim 20 wherein the control circuitry is configured to identify the presence of a foreign object by detecting when a magnitude of frequency components of the power spectral density of the signal amplitude exceed a corresponding threshold amplitude for each frequency component.

22. The wireless power transmitter of claim 20 wherein the control circuitry is further configured to identify the presence of a foreign object affecting power transfer between the power transmitting coil and the wireless power receiver when the at least one monitored variable changes by more than a threshold amount relative to a corresponding variable of a reference steady state power signal.

23. The wireless power transmitter of claim 20 wherein the control circuitry is configured to determine when wireless power transmitted is at the substantially steady power level regulated by the wireless power receiver when a signal variance associated with wireless power transmitted is less than approximately 1 percent.

24. The wireless power transmitter of claim 20 wherein the control circuitry is configured to determine when wireless power transmitted is at the substantially steady power level regulated by the wireless power receiver when a threshold time period elapses after entering a power transfer phase.

25. The wireless power transmitter of claim 20 wherein the control circuitry is configured to determine when wireless power transmitted is at the substantially steady power level regulated by the wireless power receiver using at least one message from the wireless power receiver indicating a steady power level of wireless power received.

26. The wireless power transmitter of claim 20 wherein the control circuitry is further configured to reduce wireless power transmitted via the power transmitting coil after identifying the presence of a foreign object.

27. The wireless power transmitter of claim 20 wherein the control circuitry is further configured to terminate wireless power transmission via the power transmitting coil after identifying the presence of a foreign object.

28. A wireless power transmitter comprising:
a power transmitting coil configured to transmit wireless power to a wireless power receiver; and
control circuitry coupled to the power transmitting coil, the control circuitry configured to:
drive the power transmitting coil to transmit wireless power during a power transfer period;
determine when the wireless power transmitted during the power transfer period is at a substantially steady power level regulated by the wireless power receiver, wherein the control circuitry is configured to determine when wireless power transmitted is at the substantially steady power level regulated by the wireless power receiver when a signal variance associated with wireless power transmitted is less than approximately 1 percent;
when wireless power transmitted during the power transfer period is at the substantially steady power level regulated by the wireless power receiver, monitor at least one variable associated with wireless power transmitted by the wireless power transmitting coil during the power transfer period; and
identify a presence of a foreign object affecting power transfer between the power transmitting coil and the wireless power receiver when a characteristic change of the at least one variable associated with wireless power transmitted by the wireless power transmitting coil during the power transfer period is observed.

29. The wireless power transmitter of claim 28 wherein the control circuitry is further configured to reduce wireless power transmitted via the power transmitting coil after identifying the presence of a foreign object.

30. The wireless power transmitter of claim 28 wherein the control circuitry is further configured to terminate wireless power transmission via the power transmitting coil after identifying the presence of a foreign object.

31. A wireless power transmitter comprising:
a power transmitting coil configured to transmit wireless power to a wireless power receiver; and
control circuitry coupled to the power transmitting coil, the control circuitry configured to:
drive the power transmitting coil to transmit wireless power during a power transfer period;
determine when the wireless power transmitted during the power transfer period is at a substantially steady power level regulated by the wireless power receiver, wherein the control circuitry is configured to determine when wireless power transmitted is at the substantially steady power level regulated by the wireless power receiver when a threshold time period elapses after entering a power transfer phase;

when wireless power transmitted during the power transfer period is at the substantially steady power level regulated by the wireless power receiver, monitor at least one variable associated with wireless power transmitted by the wireless power transmitting coil during the power transfer period; and identify a presence of a foreign object affecting power transfer between the power transmitting coil and the wireless power receiver when a characteristic change of the at least one variable associated with wireless power transmitted by the wireless power transmitting coil during the power transfer period is observed.

32. The wireless power transmitter of claim 31 wherein the control circuitry is further configured to reduce wireless power transmitted via the power transmitting coil after identifying the presence of a foreign object.

33. The wireless power transmitter of claim 31 wherein the control circuitry is further configured to terminate wireless power transmission via the power transmitting coil after identifying the presence of a foreign object.

\* \* \* \* \*